March 3, 1959 F. C. DRUZYNSKI 2,875,743
CONTROL FOR INTERNAL COMBUSTION ENGINE
Filed Feb. 18, 1957
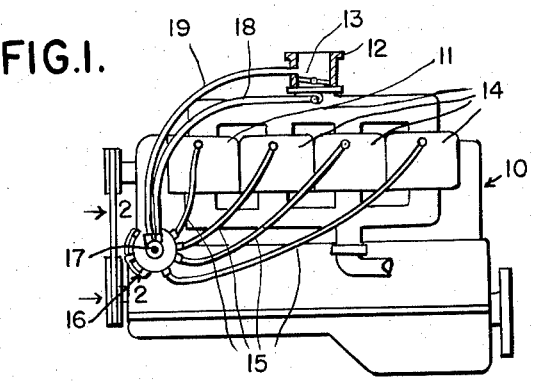
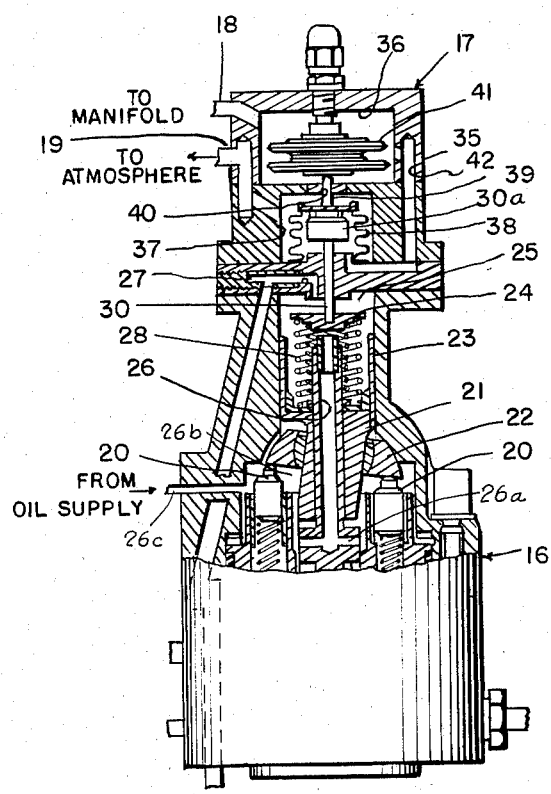
INVENTOR.
FRANK C. DRUZYNSKI
BY
ATTORNEYS

United States Patent Office 2,875,743
Patented Mar. 3, 1959

2,875,743

CONTROL FOR INTERNAL COMBUSTION ENGINE

Frank C. Druzynski, Detroit, Mich., assignor to Continental Aviation and Engineering Corporation, Detroit, Mich., a corporation of Virginia Application February 18, 1957, Serial No. 640,638

2 Claims. (Cl. 123—140)

My invention relates to automatic controls for internal combustion engines, and more particularly to an altitude compensating control for engine fuel injection system.

The basic problem confronting fuel injection equipped engines operating at altitudes above sea level is that the fuel injection fails to sense the increase in volumetric efficiency at constant manifold pressures due to the reduced exhaust pressure encountered at altitude. This results in leaner fuel air ratios at these higher altitudes with a subsequent loss in performance. The conventional injector is provided with a control which varies fuel metering in accordance with, or as a function of, air intake manifold pressures. Therefore, at all altitudes above sea level where the injector is normally calibrated, the injector will meter on the sea level calibration line. Consequently, this results in leaner fuel-air ratios because of the increase in air flow through the manifold caused by the increased volumetric efficiency occasioned by the above-mentioned reduced exhaust back pressure.

A survey of this uncompensated metering has shown that at full throttle the mixture will be too lean for best power operation, and at part throttle, too lean for smooth operation.

An object of my invention is to improve engine performance at altitudes above sea level by providing a fuel injector control device which will automatically compensate fuel metering for changes in altitude.

Another object of my invention is to provide a fuel injector control which will compensate for increased volumetric efficiency at altitudes above sea level by constructing a device for enriching fuel metering proportionately with changes in barometric pressure.

Another object of my invention is to improve fuel injection metering control by providing a simplified altitude compensator having axially aligned and connected bellows-type control elements, one element actuating the fuel injector in response to manifold pressure, the other element varying this actuation in response to the differential between manifold and atmospheric pressures.

For a more complete understanding of my invention, reference may be had to the accompanying drawing illustrating a preferred embodiment of my invention in which like characters refer to like parts throughout the several views and in which Fig. 1 is a side elevational view of a preferred internal combustion engine incorporating the invention, and Fig. 2 is a cross sectional view taken substantially on the line 2—2 of Fig. 1.

An internal combustion engine 10 is illustrated as having an air intake manifold 11 with which is associated a throttle air intake pipe 12 and a conventional throttle valve 13. Engine cylinders 14 are connected to the manifold 11 and are supplied with metered fuel through fuel lines 15 from a conventional fuel injector 16 having a control mechanism 17, preferably operated in response to manifold pressure conducted through a conduit 18 openly connected to the intake manifold 11, and altitude compensated in response to atmospheric pressure preferably sensed through a conduit 19 openly connected to the throttle inlet pipe 12.

The fuel injector 16, as illustrated in Fig. 2, is of conventional construction and generally operates as follows:

The stroke of injector plungers 20 is determined by the axial positioning of a rotating Z-shaft component 21, which directly determines the eccentricity of a wobble plate 22, which in turn determines the stroke extent of the plungers 20. One end of the Z-shaft 21 is a large diameter balancing servo piston 23 which is positioned by a servo control valve 24. The servo valve 24 bleeds pressure oil to a servo chamber 25 through a passage 26 from cross passages 26a in the Z-shaft 21, the oil entering the passages 26a from an oil chamber 26b connected by an inlet passage 26c to a source of pressure oil supply (not shown). This pressure oil continuously drains from the servo chamber 25 through a restricted drain passage or orifice 27. With the servo valve 24 held closed, the lowered drain oil pressure will permit the supply pressure to shift the Z-shaft 21 against tuning springs 28, causing a reduction in fuel flow. With the servo valve 24 held open, the balanced oil pressure across the servo piston 23 will permit the load of the tuning springs 28 to shift the Z-shaft in the other direction, causing an increase in fuel flow.

A pin shaft 30 connects the servo valve 24 with the control mechanism 17. The position of the servo valve 24 is determined by the balance between the forces exerted by the control mechanism 17 on one side and on the other side by the tuning springs 28 which are seated in the servo piston 23. The Z-shaft 21 moves to this position of equilibrium in which the force of the springs 28 is in balance with the opposing force of the control mechanism 17. Thus, it can be seen that the fuel flow is a function of the force of the control mechanism 17 and the rate and length of the spring 28.

The usual control mechanism actuates the servo valve 24 in accordance with manifold pressure changes. The control mechanism 17 shown in Fig. 2, however, preferably comprises a two-part housing 35 having a manifold pressure chamber 36 and an atmospheric pressure chamber 37, respectively openly connected through conduits 18 and 19 to the manifold 11 and the throttle valve intake pipe 12. A sealed bellows element 38 is supported in the chamber 37, sandwiched between a thrust bearing 30a on the end of the pin shaft 30 and a small diameter shaft 39 which extends through a close tolerance pressure sealing bore 40 into the chamber 36. A second sealed bellows element 41 is supported in the chamber 36, and is axially loaded by the shaft 39. It will be seen that the servo valve 24 is directly actuated through the pin shaft 30, the thrust bearing 30a and the small shaft 39, by the bellows element 41 in response to manifold pressure in the chamber 36.

Manifold pressure is introduced to the inner side of the bellows element 38 through a passage 42 in the housing 35, while atmospheric pressure in the chamber 37 acts on the opposite or outer side. Therefore, any changes in barometric or atmospheric pressure will cause a corresponding variation in the forces acting on the servo valve 24. More particularly, as atmospheric pressure drops due to a rise in altitude, the pressure differential between opposite sides of the bellows element 38 will change accordingly, causing a shift of the servo valve 24 toward a more open position, resulting in an increased oil pressure in the servo chamber 25, shifting the Z-shaft to a richer mixture position. Conversely, decrease in altitude, with a resultant increase of pressure in the chamber 37, will result in a leaner mixture. The amount of leaning or enrichment proportional to changing atmospheric pressure is only a function of the effective area of the bellows element 38.

The bellows 41 is the primary control element, and the bellows 38 is an auxiliary control element. It will be seen that variations of manifold pressure utilize the total effective area of both bellows to either operate the valve 24 toward the closed position against the compression of the spring 28, or to permit the spring 28 to actuate the valve toward the open position. In effect, the spring 28 is primarily balanced against the bellows 41, and the inclusion of the bellows 38 augments the pressure exerted on the spring by the bellows 41. That is, a decrease in manifold pressure causes the bellows 41 to expand, and the bellows 38 to contract, so that together they increase the inherent loading on the spring 28. A rise in manifold pressure causes the bellows 41 to contract and the bellows 38 to expand, thus decreasing the inherent loading on the spring 28. These changes in balance effect an adjustment of the valve 24.

Variations in atmospheric pressure, on the other hand, modify the above balancing in accordance with pressure differentials operating only on the bellows 38. It will be noted that the pin 39 is not connected to the bellows 41, but is only thrusting against it, so that upon an increase in atmospheric pressure tending to contract the bellows 38, the bellows 41 will not act as a drag on the increased loading exerted on the spring 28. It is also noted that the separate anchoring of the two bellows to the housing 35 and the axial alignment with the valve 24 provides for the accurate balancing against the spring 28 required for effective control of the pump.

In determining the effective area of the bellows element 38, the primary requisite is maintenance of best power wide-open-throttle mixtures at all altitudes. This results generally in slightly more compensation for part-throttle mixtures than is necessary for best economy; however, since the wide-open-throttle manifold pressure at the higher altitudes is already lower, thereby reducing the fuel output, it is far more important that the best power mixtures be maintained in order to keep available the maximum possible degree of power output.

It has been found that to produce the desired result, the effective area of the bellows 38 should preferably be about 40 percent of the total effective area of both bellows, giving an equation $$\frac{A}{A+B}=.4$$

for the relative bellows areas, where A is the area of the bellows 38 and B is the area of the bellows 41. Thus, the area of the bellows 38 may be found by simple calculation to be ⅔ of the area of the bellows 41.

Although I have described but one preferred embodiment of my invention, it will be apparent to one skilled in the art to which the invention pertains that various changes and modifications may be made therein without departing from the spirit of the invention or the scope of the appended claims.

I claim:

1. In an internal combustion engine having an air induction system including an air intake manifold provided with a throttle valve, a fuel injection system having a fuel pump provided with a fuel regulable means, same comprising a valve axially adjustable between an open and a closed position, a tuning spring resiliently urging said valve toward the open position, a control housing mounted on said pump and having a manifold pressure chamber and an altitude pressure chamber, means openly connecting said chambers respectively with said air intake manifold and with atmosphere, a sealed pressure responsive bellows element disposed in said manifold pressure chamber and axially aligned with said valve, a thrust pin assembly connected to said valve and extending axially into thrust engagement with said sealed bellows to exert pressure on said spring, said valve being axially adjustable in response to changes in balance of said spring and said sealed bellows effected by changes of manifold pressure acting on said sealed bellows, and a second bellows element disposed in said altitude pressure chamber axially intermediate the aforesaid sealed bellows and said valve, means communicating the interior of said second bellows with said manifold pressure chamber, said second bellows connected with said thrust pin and operable in response to differential between manifold and atmospheric pressures to modify the aforesaid balance of said spring and said sealed bellows.

2. In an internal combustion engine having an air induction system including an air intake manifold provided with a throttle valve, a fuel injection system having a fuel pump provided with a fuel regulable means, same comprising a valve axially adjustable between an open and a closed position, a tuning spring resiliently urging said valve toward the open position, a control housing mounted on said pump and having a manifold pressure chamber and an altitude pressure chamber, means openly connecting said chambers respectively with said air intake manifold and with atmosphere, a sealed pressure responsive bellows element disposed in said manifold pressure chamber and axially aligned with said valve, a thrust pin assembly connected to said valve and extending axially into thrust engagement with said sealed bellows to exert pressure on said spring, said valve being axially adjustable in response to changes in balance of said spring and said sealed bellows effected by changes of manifold pressure acting on said sealed bellows, and a second bellows element disposed in said altitude pressure chamber axially intermediate the aforesaid sealed bellows and said valve, means communicating the interior of said second bellows with said manifold pressure chamber, said second bellows connected with said thrust pin and operable in response to differential between manifold and atmospheric pressures to modify the aforesaid balance of said spring and said sealed bellows, said sealed bellows and said second bellows each being individually secured at one end to said housing, said sealed bellows and said second bellows constructed and arranged to expand axially in opposite directions with respect to said housing.

References Cited in the file of this patent

UNITED STATES PATENTS

| 2,414,617 | Summers | Jan. 21, 1947 |
| 2,435,902 | Reggio | Feb. 10, 1948 |